US010547435B2

(12) United States Patent
Hsu et al.

(10) Patent No.: US 10,547,435 B2
(45) Date of Patent: Jan. 28, 2020

(54) CONFIGURATION AND MEASUREMENT METHOD FOR PERFORMING A FULL-DUPLEX COMMUNICATION AND BASE STATION USING THE SAME

(71) Applicant: INDUSTRIAL TECHNOLOGY RESEARCH INSTITUTE, Hsinchu (TW)

(72) Inventors: Kai-Cheng Hsu, New Taipei (TW); Hung-Yu Wei, Taipei (TW); Ching-Ju Lin, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 214 days.

(21) Appl. No.: 15/210,809

(22) Filed: Jul. 14, 2016

(65) Prior Publication Data
US 2017/0264382 A1   Sep. 14, 2017

Related U.S. Application Data

(60) Provisional application No. 62/307,620, filed on Mar. 14, 2016.

(51) Int. Cl.
*H04L 5/14* (2006.01)
*H04L 5/00* (2006.01)
(Continued)

(52) U.S. Cl.
CPC ............ *H04L 5/14* (2013.01); *H04B 17/309* (2015.01); *H04B 17/336* (2015.01);
(Continued)

(58) Field of Classification Search
CPC combination set(s) only.
See application file for complete search history.

(56) References Cited

U.S. PATENT DOCUMENTS

| 8,089,907 B2 | 1/2012 | Pannell et al. |
| 2004/0131025 A1 | 7/2004 | Dohler et al. |

(Continued)

FOREIGN PATENT DOCUMENTS

| CN | 1247437 A | 3/2000 |
| CN | 1255798 A | 6/2000 |

(Continued)

OTHER PUBLICATIONS

"3rd Generation Partnership Project; Technical Specification Group Radio Access Network; Study on Network-Assisted Interference Cancellation and Suppression (NAIC) for LTE (Release 12)", 3GPP TR 36.866 V12.0.1, 2014.

(Continued)

*Primary Examiner* — Yee F Lam
(74) *Attorney, Agent, or Firm* — Rabin & Berdo, P.C.

(57) ABSTRACT

A configuration and measurement method for performing a full-duplex communication and a base station (BS) using the same is disclosed. In an embodiment, a base station selects a transmitting user equipment (UE) among one or more transmitting UEs and a receiving UE among one or more receiving UEs to form a transmit-receive (TX-RX) UE pair of one or more TX-RX UE pairs for performing the full-duplex communication, based on a first channel strength between the BS and the transmitting UE, a second channel strength between the BS and the receiving UE, and a third channel strength the transmitting UE and the receiving UE. And the BS transmits an informing message of the one or more TX-RX UE pairs for triggering the channel measurement and the information fed back.

20 Claims, 8 Drawing Sheets

(51) Int. Cl.
   *H04B 17/336*   (2015.01)
   *H04B 17/309*   (2015.01)
   *H04W 52/24*    (2009.01)
   *H04W 52/36*    (2009.01)

(52) U.S. Cl.
   CPC ......... *H04L 5/0048* (2013.01); *H04W 52/243* (2013.01); *H04W 52/367* (2013.01)

(56) References Cited

U.S. PATENT DOCUMENTS

| | | |
|---|---|---|
| 2007/0064829 A1 | 3/2007 | Zheng et al. |
| 2009/0067354 A1 | 3/2009 | Gao et al. |
| 2011/0299417 A1 | 12/2011 | Nanda et al. |
| 2012/0076173 A1 | 3/2012 | Chang et al. |
| 2012/0230247 A1 | 9/2012 | Kwon et al. |
| 2013/0194984 A1* | 8/2013 | Cheng ............... H04W 72/082 370/294 |
| 2013/0242814 A1 | 9/2013 | Wang et al. |
| 2014/0185479 A1 | 7/2014 | Lee |
| 2014/0226538 A1 | 8/2014 | Wang et al. |
| 2015/0029906 A1 | 1/2015 | Jana et al. |
| 2015/0078177 A1 | 3/2015 | Buckley et al. |
| 2015/0223173 A1 | 8/2015 | Khojastepour et al. |
| 2015/0319757 A1* | 11/2015 | Baldemair ............ H04L 5/0048 370/329 |
| 2016/0029404 A1 | 1/2016 | Aryafar et al. |
| 2016/0242197 A1* | 8/2016 | Wang .................. H04W 72/121 |
| 2016/0345315 A1* | 11/2016 | Noh .................. H04W 72/0406 |
| 2017/0041121 A1 | 2/2017 | Noh et al. |
| 2017/0064721 A1* | 3/2017 | Noh .................... H04W 72/082 |
| 2017/0078971 A1 | 3/2017 | Noh et al. |
| 2017/0273091 A1* | 9/2017 | Noh .......................... H04L 5/14 |
| 2018/0042040 A1* | 2/2018 | Chen ................ H04W 72/1263 |

FOREIGN PATENT DOCUMENTS

| | | |
|---|---|---|
| CN | 101043399 A | 9/2007 |
| CN | 101917208 A | 12/2010 |
| CN | 102405681 B | 6/2015 |
| CN | 104682996 A | 6/2015 |
| TW | 201101906 A | 1/2011 |
| TW | I478535 B | 3/2015 |
| TW | 2015-47220 A | 12/2015 |
| TW | 2016-07266 A | 2/2016 |
| WO | WO 2015-174733 A1 | 11/2015 |

OTHER PUBLICATIONS

Sanjay Goyal et al., "Improving Small Cell Capacity with Common-Carrier Full Duplex Radios", 2014 IEEE International Conference on Communications (ICC), pp. 4987-4993, Jun. 2014.

Karthikeyan Sundaresan et al.,"Full-Duplex without Strings: Enabling Full-Duplex with Half-Duplex Clients", Proceedings of the 20th annual international conference on Mobile computing and networking, ACM 978-1-4503-2783-1/14/09, pp. 55-66, Sep. 2014.

Ehsan Aryafar et al., "FD2: A Directional Full Duplex Communication System for Indoor Wireless Networks", 2015 IEEE Conference on Computer Communications (INFOCOM), pp. 1993-2001, May 2015.

Jingwen Bai et al., "Distributed Full-duplex via Wireless Side-Channels: Bounds and Protocols", IEEE Transactions on Wireless Communications (vol. 12, Issue 8), pp. 4162-4173, Jul. 30, 2013.

Li Li et al., "Non-Coherent Successive Relaying and Cooperation: Principles, Designs, and Applications", IEEE Communications Surveys & Tutorials (vol. 17, Issue 3), pp. 1708-1737, Apr. 17, 2015.

Elaheh Askari et al., "Single-band full-duplex MAC protocol for distributed access networks", IET Communications (vol. 8, Issue: 10), pp. 1663-1673, Jul. 3, 2014.

Aimin Tang et al., "A-Duplex: Medium Access Control for Efficient Coexistence Between Full-Duplex and Half-Duplex Communications", IEEE Transactions on Wireless Communications (vol. 14, Issue: 10), pp. 5871-5885, Jun. 12, 2015.

Dinesh Bharadia et al., "FastForward: Fast and Constructive Full Duplex Relays", Proceedings of the 2014 ACM conference on SIGCOMM, pp. 199-210, Aug. 17, 2014.

Taiwanese Office Action dated Nov. 21, 2017.

U.S. Office Action dated Dec. 8, 2017 for related U.S. Appl. No. 15/210,839.

Taiwanese Office Action dated Sep. 12, 2017.

Chinese Office Action dated May 25, 2018.

\* cited by examiner listening to, by the BS, a reference signal transmitted by said transmitting UE selected by the BS to measure a first channel information that includes the first channel strength and a first channel phase between the BS and said transmitting UE, and to know a maximum transmission power of said transmitting UE — 30

FIG. 3 transmitting a BS reference signal, by the BS, for having said receiving UE selected by the BS to measure a second channel information that includes the second channel strength and a second channel phase between the BS and said receiving UE, and to feed back the second channel information to the BS — 40

FIG. 4 wherein number of the one or more TX-RX UE pairs selected is based on an antenna number of the BS — 60

FIG. 6 wherein the informing message comprising a plurality of identifications of the TX-RX UE pair of the one or more TX-RX UE pairs, one or more reference signal orders for said transmitting UE selected by the BS and one or more feedback orders for said receiving UE selected by the BS — 70 wherein each of the one or more reference signal orders includes an order of said transmitting UE selected by the BS transmitting a reference signal and a transmitting resource to use for said transmitting UE, and wherein each of the one or more feedback orders includes an order of said receiving UE selected by the BS feeding back information and a feedback resource to use for said receiving UE — 703

FIG. 7 wherein the informing message triggers said transmitting UE selected by the BS to transmit a transmitting UE reference signal to have said receiving UE selected by the BS measuring a third channel information that includes the third channel strength and a third channel phase between said transmitting UE and said receiving UE, and feeding back the third channel information to the BS ⟶ 80

FIG. 8 wherein the informing message triggers said receiving UE selected by the BS to transmit a successive interference cancellation (SIC) decoding ability to the BS ⟶ 90

FIG. 9 wherein the one or more receiving UEs and the one or more transmitting UEs respectively comprise at least one of : one or more half-duplex UEs, one or more full-duplex UEs, or any combination of two or more of selected from the one or more half-duplex UEs and the one or more full-duplex UEs ⟶ 100

FIG. 10

CONFIGURATION AND MEASUREMENT METHOD FOR PERFORMING A FULL-DUPLEX COMMUNICATION AND BASE STATION USING THE SAME

CROSS-REFERENCE TO RELATED APPLICATION

This non-provisional application claims priority under 35 U.S.C. § 119(e) of a U.S. Provisional Application No. 62/307,620 filed on Mar. 14, 2016, the entirety of which is incorporated herein by reference.

TECHNICAL FIELD

The technical field relates to a configuration and measurement method for performing full-duplex communications and a base station using the same.

BACKGROUND

The full-duplex communication is not a new issue, but why the current wireless networks are still half-duplex channel link, Time Division Duplex (TDD) or Frequency Division Duplex (FDD), is that there may be a lack of feasible solutions in hardware for wireless full-duplex radio in the past. However, some research groups start and succeed to propose feasible solutions and design a real full-duplex radio system in recent years.

Nowadays, the frequency band below 5 GHz has become extremely scarce, so improving spectrum efficiency or finding new frequency band is needed gradually for future wireless networks. Current wireless networks are often operating on the TDD system or the FDD system because a base station (BS) may only transmit or receive at one time and at same frequency band. When operating in a TDD system, both the transmitter and the receiver use the same frequency but transmitting operation and receiving operation are switched by time. While operating in a FDD system, two different radio frequencies are used for transmitting operation and receiving operation, respectively. With the full-duplex capability, the BS can simultaneously serve uplink and downlink clients at same time and at same frequency band, so the full-duplex networks may have the potential to double spectrum efficiency theoretically.

However, different from half-duplex networks/communication systems, a base station operating in full-duplex networks has now to serve uplink and downlink clients simultaneously, so the procedure of performing the configuration and the measurement will be different.

Therefore, it is becoming a design consideration on how to perform full-duplex communications in the current wireless networks or future wireless networks.

SUMMARY

Exemplary embodiments in accordance with the application provide a base station and a configuration and measurement method for performing a full-duplex communication.

An exemplary embodiment provides a configuration and measurement method for performing a full-duplex communication. In this exemplary embodiment of the method, a base station (BS) selects a transmitting user equipment (UE) among one or more transmitting UEs and a receiving UE among one or more receiving UEs to form a transmit-receive (TX-RX) UE pair of one or more TX-RX UE pairs for performing the full-duplex communication, based on a first channel strength between the BS and the transmitting UE, a second channel strength between the BS and the receiving UE, and a third channel strength between the transmitting UE and the receiving UE. And the BS transmits an informing message of the one or more TX-RX UE pairs for triggering at least one channel measurement and at least one information fed back.

Another exemplary embodiment provides a base station (BS) for performing a full-duplex communication. The BS includes a transceiver unit and a processor coupled to the transceiver unit. The transceiver unit includes one or more antennas, and the transceiver unit is configured for transmitting and receiving. The processor is configured to select a transmitting user equipment (UE) among one or more transmitting UEs and a receiving UE among one or more receiving UEs to form a transmit-receive (TX-RX) UE pair of one or more TX-RX UE pairs for performing the full-duplex communication, based on a first channel strength between the BS and the transmitting UE, a second channel strength between the BS and the receiving UE, and a third channel strength between the transmitting UE and the receiving UE. And the processor is configured to transmit, via the transceiver unit, an informing message of the one or more TX-RX UE pairs for triggering at least one channel measurement and at least one information fed back.

The foregoing will become better understood from a careful reading of a detailed description provided herein below with appropriate reference to the accompanying drawings.

BRIEF DESCRIPTION OF THE DRAWINGS

FIG. 3 shows another operating flow of a configuration and measurement method for performing a full-duplex communication in accordance with another exemplary embodiment of the application.

FIG. 4 shows another operating flow of a configuration and measurement method for performing a full-duplex communication in accordance with another exemplary embodiment of the application.

FIG. 6 shows a configuration and measurement method for performing a full-duplex communication in accordance with an exemplary embodiment of the application.

FIG. 7 shows a configuration and measurement method for performing a full-duplex communication in accordance with exemplary embodiments of the application.

FIG. 8 shows a configuration and measurement method for performing a full-duplex communication in accordance with an exemplary embodiment of the application.

FIG. 9 shows a configuration and measurement method for performing a full-duplex communication in accordance with another exemplary embodiment of the application.

FIG. 10 shows a configuration and measurement method for performing a full-duplex communication in accordance with another exemplary embodiment of the application.

DETAILED DESCRIPTION OF THE EXEMPLARY EMBODIMENTS

Figure 1:
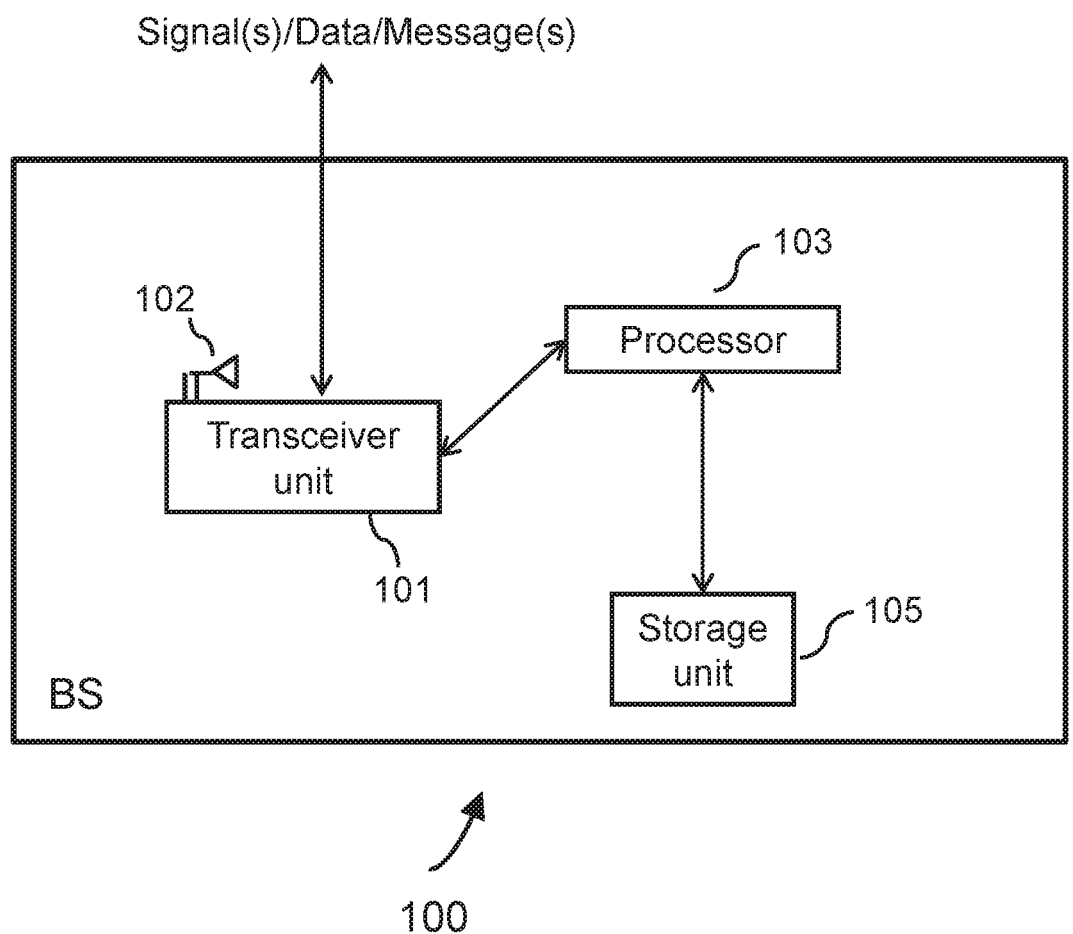
FIG. 1 shows a schematic diagram of a base station (BS) for performing a full-duplex communication in accordance with an exemplary embodiment of the application.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The disclosure will demonstrate the exemplary embodiments of a configuration and measurement method for performing a full-duplex communication and a base station using the same. A user equipment (UE) may be any electronic device that can perform the operations describing the exemplary embodiments of the application. For example, user equipment may include, but not limited to, a portable phone, a smart phone, a personal digital assistant (PDA), a mobile phone, a satellite phone, a wireless phone, a handheld device/mobile device capable of wireless communication, a portable multimedia player (PMP), and a processing device coupled to a wireless MODEM. Furthermore, user equipment may include a system, a device, a user device, and a communication device, a subscriber unit, a mobile unit, a mobile terminal, a remote terminal, an access terminal, a user terminal, a terminal a subscriber station, and a remote station. The application, however, is not limited thereto, and other types of user equipment, such as any type of laptop personal computers and other computing devices may operatively incorporate in embodiments of the application.

FIG. 1 shows a schematic diagram of a base station (BS) 100 for performing a full-duplex communication in accordance with an exemplary embodiment of the application. In an embodiment, the BS 100 comprises a transceiver unit 101, a processor 103 and a storage unit 105. The transceiver unit 101 comprises one or more antennas 102, is configured for transmitting and receiving. The processor 103 is operatively coupled to the transceiver unit 101 and the storage unit 105. The BS 100 may able to serve at least one pair of uplink transmitting UE and downlink receiving UE simultaneously depends on its antenna number to perform full-duplex communications. The BS 100 is a full-duplex base station, which has the self-interference cancellation capability to enable transmission and receiving in the same frequency at the same time.

Figure 2:
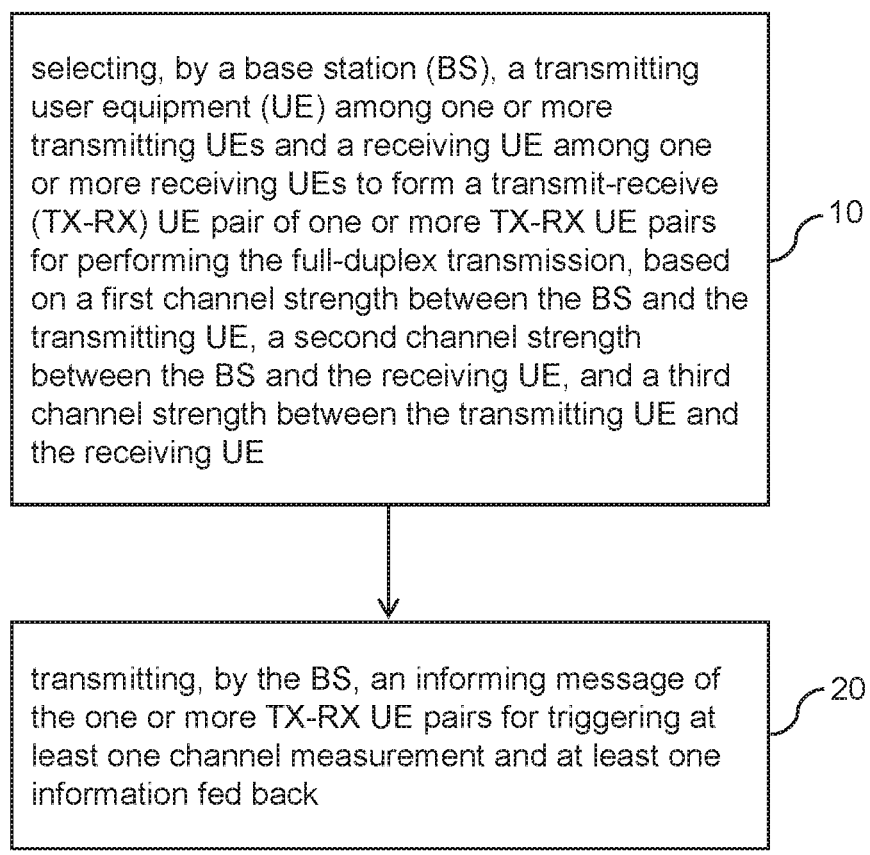
FIG. 2 shows an operating flow of a configuration and measurement method for performing a full-duplex communication in accordance with an exemplary embodiment of the application.

As shown in FIG. 2, an operating flow of the configuration and measurement method for performing a full-duplex communication in accordance with an exemplary embodiment of the application is disclosed. Refer to the block 10, a base station (BS 100) selects a transmitting user equipment (UE) among one or more transmitting UEs and a receiving UE among one or more receiving UEs to form a transmit-receive (TX-RX) UE pair of one or more TX-RX UE pairs for performing the full-duplex communication, based on a first channel strength between the BS 100 and the transmitting UE, a second channel strength between the BS 100 and the receiving UE, and a third channel strength between the transmitting UE and the receiving UE. And in block 20 of FIG. 2, the BS 100 transmits an informing message of the one or more TX-RX UE pairs for triggering at least one channel measurement and at least one information fed back. In an embodiment, the processor 103 of the BS 100 is configured to select the transmitting UE and the receiving UE of said TX-RX UE pair, and transmit the informing message via the transceiver unit 101.

FIG. 3 and FIG. 4 show an operating flow of the configuration and measurement method for performing a full-duplex communication in accordance with the respective exemplary embodiment of the application. In the embodiment of FIG. 3, the BS 100 may listen to, via the transceiver 101, a reference signal transmitted by said transmitting UE (of the TX-RX UE pair of the one or more TX-RX UE pairs) selected by the BS 100 to measure a first channel information that includes the first channel strength and a first channel phase between the BS 100 and said transmitting UE, and to know a maximum transmission power of said transmitting UE, as shown in block 30 of FIG. 3. In an embodiment, the processor 103 of the BS 100 is configured to listen to the transmitting UE reference signal via the transceiver 101.

In another embodiment of FIG. 4, the BS 100 may transmit a BS reference signal for having said receiving UE (of the TX-RX UE pair of the one or more TX-RX UE pairs) selected by the BS 100 to measure a second channel information that includes the second channel strength and a second channel phase between the BS 100 and said receiving UE, and to feed back the second channel information to the BS 100 (block 40 in FIG. 4). In an embodiment, the processor 103 of the BS 100 is configured to transmit the BS reference signal via the transceiver unit 101.

Figure 5:
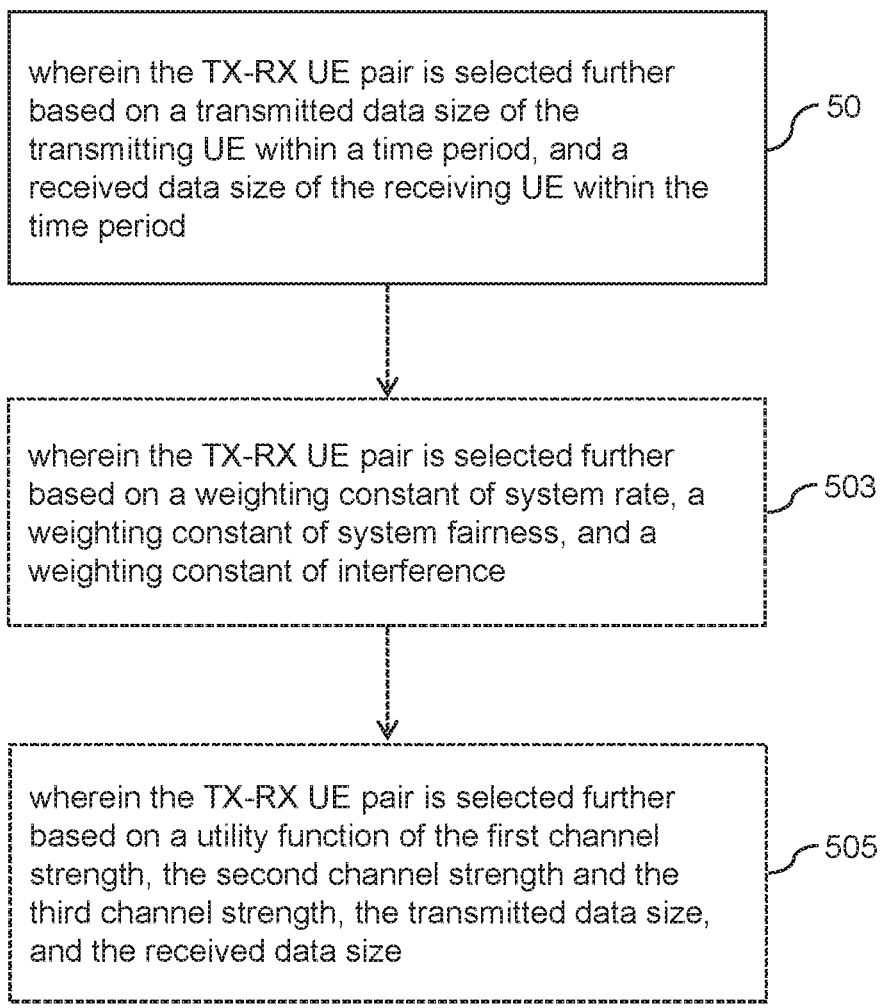
FIG. 5 shows a configuration and measurement method for performing a full-duplex communication in accordance with exemplary embodiments of the application.

FIG. 5 shows a configuration and measurement method for performing a full-duplex communication in accordance with exemplary embodiments of the application. Wherein in an embodiment, as shown in block 501, the TX-RX UE pair may be selected further based on a transmitted data size of the transmitting UE within a time period, and a received data size of the receiving UE within the time period. Wherein in another embodiment, the TX-RX UE pair may be selected further based on a weighting constant of system rate, a weighting constant of system fairness, and a weighting constant of interference, as shown in block 503 of FIG. 5. Wherein, yet in another embodiment as shown in block 505, the TX-RX UE pair may be selected further based on a utility function of the first channel strength, the second channel strength, the third channel strength, the transmitted data size, and the received data size.

A block 60 shown in FIG. 6 discloses an exemplary embodiment of the application, wherein the number of the one or more TX-RX UE pairs may be based on the number of antennas 102 (referred as antenna number) of the BS 100.

FIG. 7 shows a configuration and measurement method for performing a full-duplex communication in accordance with exemplary embodiments of the application. Wherein, a block 70 discloses an embodiment of the application, in which the informing message may comprise a plurality of identifications of the TX-RX UE pair of the one or more TX-RX UE pairs, one or more reference signal orders for said transmitting UE selected by the BS 100 and one or more feedback orders for said receiving UE selected by the BS 100. Wherein, in another embodiment shown in block 703 of FIG. 7, each of the reference signal orders may include an order of said transmitting UE selected by the BS 100 transmitting a reference signal and a transmitting resource for said transmitting UE, and wherein each of the feedback orders may include an order of said receiving UE selected by the BS 100 feeding back information and a feedback resource for said receiving UE.

A block 80 shown in FIG. 8 discloses an embodiment of the application, wherein the informing message may trigger said transmitting UE selected by the BS 100 to transmit a transmitting UE reference signal to have said receiving UE selected by the BS 100 measuring a third channel information that includes the third channel strength and a third channel phase between said transmitting UE and said receiving UE, and feeding back the third channel information to the BS 100.

A block 90 shown in FIG. 9 discloses another embodiment of the application, wherein the informing message may trigger the receiving UE of the TX-RX UE pair of the one or more TX-RX UE pairs to transmit a successive interference cancellation (SIC) decoding ability to the BS 100.

FIG. 10 shows an operating flow of the configuration and measurement method for performing a full-duplex communication in accordance with another exemplary embodiment of the application, wherein the one or more receiving UEs and the one or more transmitting UEs respectively comprise at least one of the following: one or more half-duplex UEs, one or more full-duplex UEs, or any combination of two or more of the one or more half-duplex UEs and the one or more full-duplex UEs (block 100 of FIG. 10). The UEs those could be served by the BS 100 may be all half-duplex UEs, all full-duplex UEs, or the combination of half-duplex UE(s) and full-duplex UE(s). A full-duplex UE is a UE having the ability to perform full-duplex communications and a half-duplex UE is a UE only having the ability to perform half-duplex communications.

Figure 11:
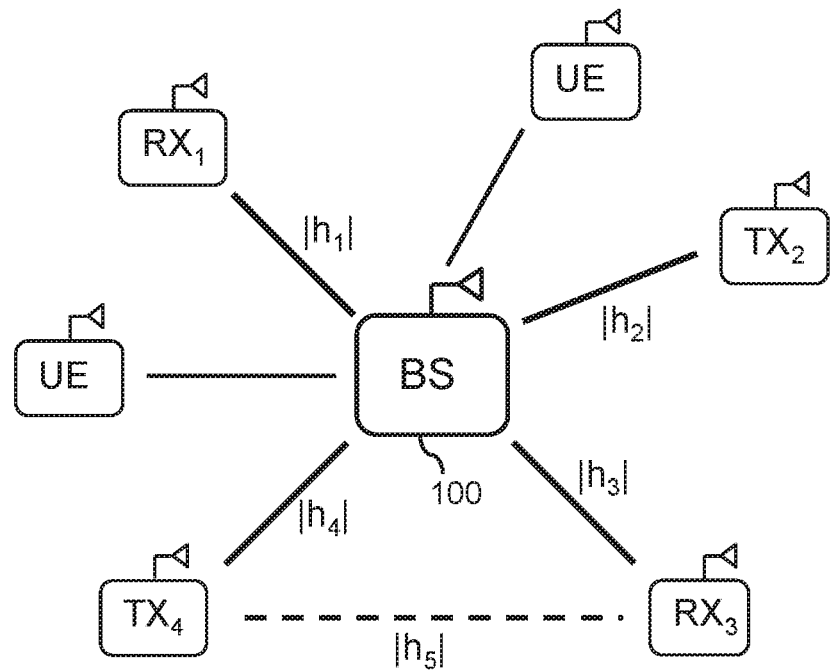
FIG. 11 shows a schematic diagram of a base station (BS) to gather channel strengths in accordance with an exemplary embodiment of the application.

A base station may gather channel strength of clients those who demand either uplink or downlink transmission. FIG. 11 shows a schematic diagram of a base station (BS 100) to gather channel strengths in accordance with an embodiment of the application. The inter-client channel strength and the channel strength between a base station and each of the UEs may be recorded and updated either from latest information exchange or from initial link establishment. Refer to FIG. 10, $|h_1|$ represents the channel strength between the BS 100 and the downlink receiving UE $RX_1$; $|h_2|$ represents the channel strength between the BS 100 and the uplink transmitting UE $TX_2$; $|h_3|$ represents the channel strength between the BS 100 and the receiving UE $RX_3$; and $|h_4|$ represents the channel strength between the BS 100 and the transmitting UE $TX_4$.

A base station may further gather the inter-UE channel strength information from a history record. The BS 100 will have inter-UE channel strength history if there are any two clients having transmitted information to each other in the past, as shown in FIG. 11. The $|g_5|$ represents the channel strength between the transmitting UE $TX_4$ and the receiving UE $RX_3$. For the scenario of without existing inter-UE channel strength history, that is, the channel strength between the transmitting UE $TX_2$ and the receiving UE $RX_1$, for example, may be set to be the average of all inter-UE channel strengths existing in the history record. Refer to FIG. 11, the average of all inter-UE channel strengths currently existing in the record will be set to $|h_5|$.

In an exemplary embodiment of the application, the BS 100 may select one or more pairs of a transmitting UE and a receiving UE and form the TX-RX UE pair(s) for performing the full-duplex communication based on a first channel strength between the base station and the transmitting UE, a second channel strength between the base station and the receiving UE, and a third channel strength between the transmitting UE and the receiving UE. In another embodiment, the BS 100 may further select a TX-RX UE pair based on a transmitted data size of the transmitting UE within a time period, and a received data size of the receiving UE within the time period. Furthermore in an embodiment, the BS 100 may select the TX-RX UE pair further based on a weighting constant of system rate, a weighting constant of system fairness, and a weighting constant of interference.

In an embodiment of the application, based on a utility function Utility($u^{TX}, u^{RX}$) of a first channel strength between the base station and the transmitting UE, a second channel strength between the base station and the receiving UE, and a third channel strength between the transmitting UE and the receiving UE, the BS 100 may select the pair of transmitting and receiving UEs (that is, the TX-RX UE pair(s)) for performing the full-duplex communication. In an exemplary embodiment, for the BS 100 having an antenna number $N \geq 1$, the BS 100 may select N transmitting UEs (denoted by $u^{TX}$) from a transmitting UE candidate set T and N receiving UEs (denoted by $u^{RX}$) from a receiving UE candidate set R which satisfies arg $\text{Max}_{u_1^{TX}, \ldots, u_N^{TX} \in T, u_1^{RX}, \ldots, u_N^{RX} \in R}$Utility($u^{TX}, u^{RX}$) to form the TX-RX UE pair without any repeated UE. The number of the one or more TX-RX UE pairs may be selected base on the antenna number of the BS 100. In an embodiment, the number of UE in the transmitting candidate set T may equal to the number of UE in the receiving candidate set R. In another embodiment, the number of UE in the transmitting candidate set T and in the receiving candidate set R may differ.

In an exemplary embodiment, the pair of transmitting and receiving UEs may be selected jointly by the BS 100 based on a utility function. The utility function may be defined as $$\text{Utility}(UE1, UE2) = \sum_{n=1}^{N} \left\{ \frac{|h_{UE1_n}|^{C_1}}{1 + T_{UE1_n}^{C_2}} + \frac{|h_{UE2_n}|^{C_1}}{1 + \sum_{k=1}^{N} \{|h_{UE1_n \to UE2_n}|^{C_3}\} + T_{UE2_n}^{C_2}} \right\},$$

UE1$\in$T, and UE2$\in$R. The $|h_{UE}|$ is the channel strength between the client UE and the BS 100, $|h_{UE1 \to UE2}|$ is the channel strength from a user equipment UE1 to another user equipment UE2, $T_{UE}$ is the size of total served data (for example, total transmitted or received data) in kilobytes within the past t seconds for the user equipment (UE). For example, if a UE X has transmitted or received 3 KB data in the past 1 second, then its $T_x$ is equal to 3. $C_1$ is a weighting constant concerning the system rate, which is a real-value constant for weighting the effect of channel strength between the UE and the base station. $C_2$ is a weighting constant concerning the system fairness, which is a real-value constant for weighting the effect of the served data size for the UE. $C_3$ is a weighting constant concerning the interference, which is a real-value constant for weighting the effect of interference. The values of $C_1$, $C_2$ and $C_3$ in the utility function may be defined according to the one or more concerning parameters of a system. For example, for the fairness-oriented system, $C_2$ may dominate $C_1$ and $C_3$, such as defining the values of $C_1$, $C_2$ and $C_3$ as $C_2=2$, $C_1=C_3=1$, and for the throughput-oriented system, $C_1$ may dominate $C_2$ and $C_3$, such as defining the values of $C_1$, $C_2$ and $C_3$ as $C_1=2$, $C_2=C_3=1$.

Figure 12:
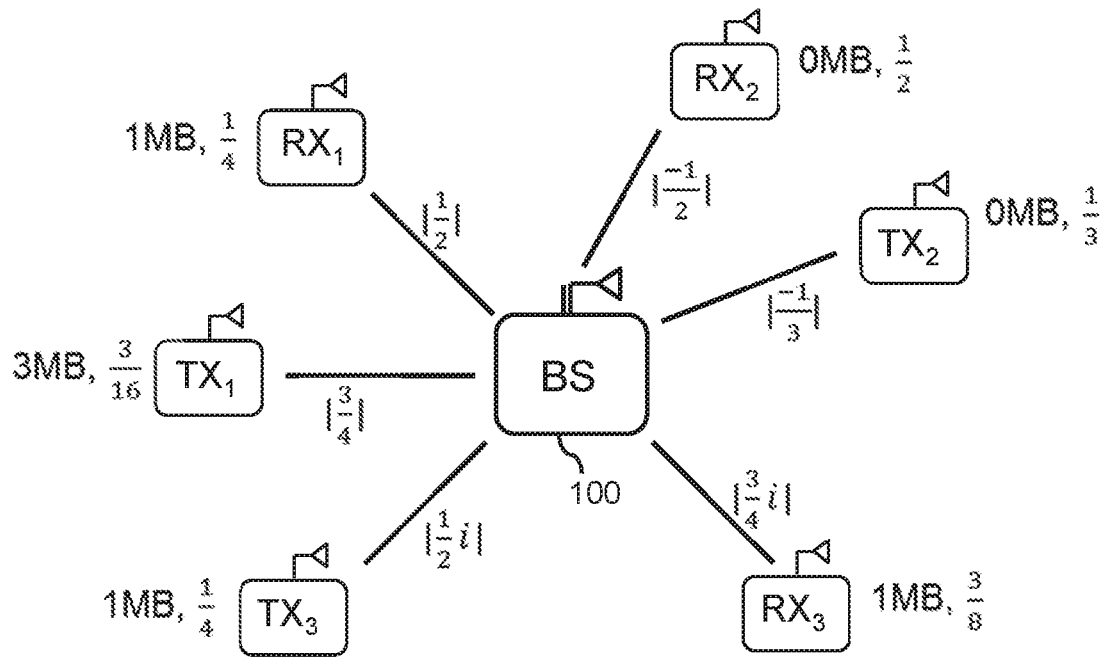
FIG. 12 shows a schematic diagram of a base station (BS) to select TX-RX UE pairs for performing a full-duplex communication in accordance with an exemplary embodiment of the application.

FIG. 12 shows a schematic diagram of a base station (BS) to select TX-RX UE pairs for performing the full-duplex communication according to an exemplary embodiment. In FIG. 12, the BS 100 gathers the channel strengths and the transmitted data size for those either uplink or downlink UEs in the past. The channel strengths and the transmitted data in the past are ½ (that is, |½|) and 1 MB for the UE $RX_1$; ½ (that is, |–½|) and 0 MB for the UE $RX_2$; ¾ (that is, |¾i|) and 1 MB for the UE $RX_3$; ¾ (that is, |¾|) and 3 MB for the UE $TX_1$; ⅓ (that is, |–⅓i|) and 0 MB for the UE $TX_2$; ½ (that is, |½i|) and 1 MB for the UE $TX_3$.

In an embodiment for a base station having two antennas, the base station selects two transmitting UEs and two receiving UEs based on the utility function Utility(UE1, UE2). In the scenario of setting $C_1=C_2=C_3=1$ and without existing channel strength history, the utilities of each client are: ¼ for the UE $RX_1$; ½ for the UE $RX_2$; ⅜ for the UE $RX_3$; 3/16 for the UE $TX_1$, ⅓ for $TX_2$ and ¼ for the UE $TX_3$, as shown in FIG. 12. Hence, the first two transmitting UEs with larger utility are $TX_2$ and $TX_3$, and the first two receiving UEs with larger utility are $RX_2$ and $RX_3$. These four clients then be selected for the full-duplex transmission.

After the aforementioned selection of TX-RX UE pair(s), the BS 100 informs clients of informing messages. In an embodiment, the informing messages may include the identifications (IDs) of the selected TX-RX UE pair(s), the one or more reference signal orders of transmitting UE(s) and the one or more feedback orders of receiving UE(s). The reference signal orders include an order of the transmitting UE(s) transmitting the reference signal and a transmitting resource (for instance, which frequency band(s), which time, the transmission power and which physical resource block(s) to use for the transmitting UE(s) to transmit the reference signal). And the feedback orders include an order of the receiving UE(s) feeding back information and a feedback resource (for instance, which frequency band(s), which time, and which physical resource block(s) to use for the receiving UE(s) to feed back information). The order of aforesaid operating may not be restricted to any specific order. In the application, the method for the BS 100 to inform clients is not restricted to any specific kind of transmitting method. In an embodiment, both the BS 100 and the transmitting UE transmit the reference signal based on their allocated orders.

Figure 13:
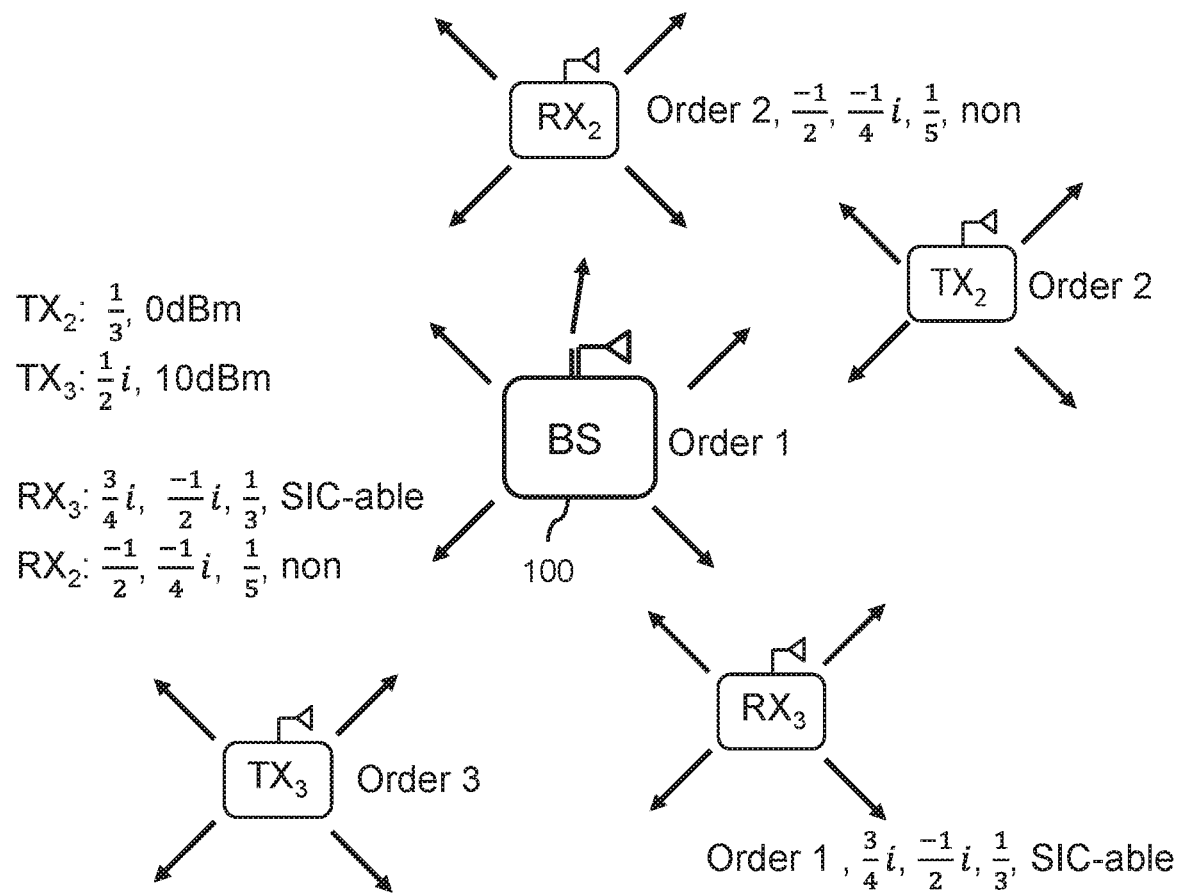
FIG. 13 shows a schematic diagram of the BS, the transmitting UEs and the receiving UEs for performing the channel measurement, and the information feedback in accordance with an exemplary embodiment of the application.

The BS 100 informs the transmitting UE and the receiving UE of the selection result and the order for facilitating the transmitting UE to transmit reference signal and the receiving UE to feed back information. The informing message includes the UE $TX_2$ being order 2, the UE $TX_3$ being order 3, the UE $RX_2$ being order 2, the UE $RX_3$ being order 1, and the BS 100 being the first order to transmit reference signal, as shown in FIG. 13. The informing message could let the clients knowing who is a target and the operating order thereof.

After knowing the selection result and the order, the BS 100 and the clients start to transmit reference signal. The BS 100 is the first-order node to transmit a knowable sequence, for example, a sequence that both the base station and the client know such as 11110000, to the receiving UEs for the channel measurement, as shown in FIG. 13. The UE $RX_2$ and the UE $RX_3$ learn the channel information –½ and ¾ respectively from the BS 100. The second-order UE $TX_2$ transmits its message including a maximum transmission power 0 dBm and a knowable sequence to BS and receiving UEs, as shown in FIG. 13. The BS 100, the UEs $RX_2$ and $RX_3$ learn the channel information ⅓, –¼i and –½i respectively from the UE $TX_2$. The BS 100 also get the knowledge that the maximum transmission power of the UE $TX_2$ is 0 dBm.

The last-order UE $TX_3$ transmits its message including a maximum transmission power 10 dBm and a knowable sequence to the BS 100 and the receiving UEs, as shown in FIG. 13. The BS 100, the UEs $RX_2$ and $RX_3$ learn the channel information ½i, ⅕ and ⅓ respectively from the UE $TX_3$. The BS 100 also get the knowledge that the maximum transmission power of the UE $TX_3$ is 10 dBm.

In the aforementioned exemplary embodiment, the BS 100 may transmit its reference signal including its ID and a knowable sequence for measuring the channel information by the receiving UE. The transmitting UE(s) may broadcast its reference signal including its ID, its maximum transmission power and a knowable sequence for the measuring by the receiving UE(s) and the base station. Based on the informing message, the BS 100 and the receiving UE(s) may listen to and measure the reference signal at the pre-defined time and frequency band to get the channel strength.

The receiving UE may further feed back a message, including BS-to-downlink channel information, uplink-to-downlink channel information and the hardware decoding ability of the receiving UE, to BS alternately, as shown in FIG. 13. The feedback order of the receiving UE is determined by the informing message of the BS, and the channel information is measured by using the BS reference signal and the transmitting UE reference signal. The hardware decoding ability specifies the receiving UE could decode by what kind of ways, such as successive interferenc cancellation (SIC) or a way of non-SIC, for example, "SIC-able" or "non", as indicated in FIG. 13. The BS 100 records all the feedback information for the use of data transmission and future configuration and measurement.

The receiving UE may further feed back its information to the BS 100. As shown in FIG. 13, the first order receiving UE $RX_3$ feeds back the measured channel information ¾i, –½i, ⅓ and its hardware decoding ability "SIC-able" to the BS 100. The UE $RX_3$ learns the measured channel information respectively from the BS 100, the transmitting UEs $TX_2$ and $TX_3$. And, the hardware decoding ability "SIC-able" of the UE $RX_3$ indicates it could decode by the way of SIC. The second order receiving UE RX2 then feeds back the measured channel information–½, –¼i, ⅕, and its hardware decoding ability "non" to the BS 100. The UE RX2 learns the measured channel information respectively from the BS 100, the UEs $TX_2$ and $TX_3$. And, its hardware decoding ability "non" indicates it may only decode by a normal way. After receiving the feedback information, the BS 100 may then process the full-duplex transmission.

In the embodiment, the BS 100 may know the maximum transmission power of transmitting UEs, decoding abilities of receiving UEs and the channel knowledge of uplink-to-BS channel, uplink-to-downlink channel and BS-to-downlink channel. In the embodiment the full-duplex transmission pair is chosen, including two or more receiving UEs and two or more transmitting UEs, and clients also know whether they are targets or not.

It is intended that the specification and examples be considered as exemplary embodiments only, with a true scope of the application being indicated by the following claims and their equivalents.

What is claimed is:

1. A configuration and measurement method for performing a full-duplex communication, comprising:
selecting, by a base station (BS), a transmitting user equipment (UE) among one or more transmitting UEs and a receiving UE among one or more receiving UEs to form a transmit-receive (TX-RX) UE pair of one or more TX-RX UE pairs for performing the full-duplex communication, based on a utility function of the TX-RX UE pair, which is calculated according to a first channel strength between the BS and the transmitting UE of the TX-RX UE pair, a second channel strength between the BS and the receiving UE of the TX-RX UE pair, a third channel strength between the transmitting UE of the TX-RX UE pair and the receiving UE of the TX-RX UE pair, a transmitted data size of the transmitting UE within a time period, and a received data size of the receiving UE within the time period; and
transmitting, by the BS, an informing message of the one or more TX-RX UE pairs for triggering at least one channel measurement and at least one information fed back.

2. The configuration and measurement method of claim 1, wherein the TX-RX UE pair is selected further based on a weighting constant of system rate, a weighting constant of system fairness, and a weighting constant of interference.

3. The configuration and measurement method of claim 1, wherein number of the one or more TX-RX UE pairs is based on an antenna number of the BS.

4. The configuration and measurement method of claim 1, wherein the informing message comprising a plurality of identifications of the TX-RX UE pair of the one or more TX-RX UE pairs, one or more reference signal orders for said transmitting UE selected by the BS and one or more feedback orders for said receiving UE selected by the BS.

5. The configuration and measurement method of claim 4, wherein each of the one or more reference signal orders includes an order of said transmitting UE selected by the BS transmitting a reference signal and a transmitting resource for said transmitting UE, and wherein each of the one or more feedback orders includes an order of said receiving UE selected by the BS feeding back information and a feedback resource for said receiving UE.

6. The configuration and measurement method of claim 1, further comprising:
listening to, by the BS, a reference signal transmitted by said transmitting UE selected by the BS to measure a first channel information that includes the first channel strength and a first channel phase between the BS and said transmitting UE and to know a maximum transmission power of said transmitting UE.

7. The configuration and measurement method of claim 1, further comprising:
transmitting a BS reference signal, by the BS, for having said receiving UE selected by the BS to measure a second channel information that includes the second channel strength and a second channel phase between the BS and said receiving UE, and to feed back the second channel information to the BS.

8. The configuration and measurement method of claim 1, wherein the informing message triggers said transmitting UE selected by the BS to transmit a transmitting UE reference signal to have said receiving UE selected by the BS measuring a third channel information that includes the third channel strength and a third channel phase between said transmitting UE and said receiving UE, and feeding back the third channel information to the BS.

9. The configuration and measurement method of claim 1, wherein the informing message triggers said receiving UE selected by the BS to transmit a successive interference cancellation (SIC) decoding ability to the BS.

10. The configuration and measurement method of claim 1, wherein the one or more receiving UEs and the one or more transmitting UEs respectively comprise at least one of: one or more half-duplex UEs, one or more full-duplex UEs, or any combination of two or more of the one or more half-duplex UEs and the one or more full-duplex UEs.

11. A base station (BS) for performing a full-duplex communication, comprising:
a transceiver unit, comprising one or more antennas, and configured for transmitting and receiving; and
a processor coupled to the transceiver unit, and configured to:
select a transmitting user equipment (UE) among one or more transmitting UEs and a receiving UE among one or more receiving UEs to form a transmit-receive (TX-RX) UE pair of one or more TX-RX UE pairs for performing the full-duplex communication, based on a utility function of the TX-RX UE pair, which is calculated according to a first channel strength between the BS and the transmitting UE of the TX-RX UE pair, a second channel strength between the BS and the receiving UE of the TX-RX UE pair, a third channel strength between the transmitting UE of the TX-RX UE pair and the receiving UE of the TX-RX UE pair, a transmitted data size of the transmitting UE within a time period, and a received data size of the receiving UE within the time period; and
transmit, via the transceiver unit, an informing message of the one or more TX-RX UE pairs for triggering at least one channel measurement and at least one information fed back.

12. The base station of claim 11, wherein the TX-RX UE pair is selected further based on a weighting constant of system rate, a weighting constant of system fairness, and a weighting constant of interference.

13. The base station of claim 11, wherein number of the one or more TX-RX UE pairs selected is based on a number of the one or more antennas of the transceiver unit.

14. The base station of claim 11, wherein the informing message comprising a plurality of identifications of the TX-RX UE pair of the one or more TX-RX UE pairs, one or more reference signal orders for said transmitting UE selected by the processor and one or more feedback orders for said receiving UE selected by the processor.

15. The base station of claim 14, wherein each of the one or more reference signal orders includes an order of said transmitting UE selected by the processor transmitting the reference signal and a transmitting resource for said transmitting UE, and wherein each of the one or more feedback orders includes an order of said receiving UE selected by the processor feeding back information and a feedback resource for said receiving UE.

16. The base station of claim 11, wherein the processor is further configured to:
listen to, via the transceiver unit, a reference signal transmitted by said transmitting UE selected by the processor to measure a first channel information that includes the first channel strength and a first channel phase between the BS and said transmitting UE, and to know a maximum transmission power of said transmitting UE.

17. The base station of claim 11, wherein the processor is further configured to:

transmit, via the transceiver unit, a BS reference signal for having said receiving UE selected by the processor to measure a second channel information that includes the second channel strength and a second channel phase between the BS and said receiving UE, and to feed back the second channel information to the BS.

18. The base station of claim 11, wherein the informing message triggers said transmitting UE selected by the processor to transmit a transmitting UE reference signal to have said receiving UE selected by the processor measuring a third channel information that includes the third channel strength and a third channel phase between said transmitting UE and said receiving UE, and feeding back the third channel information to the BS.

19. The base station of claim 11, wherein the informing message triggers said receiving UE selected by the processor to transmit a successive interference cancellation (SIC) decoding ability of said receiving UE to the BS.

20. The base station of claim 11, wherein the one or more receiving UEs and the one or more transmitting UEs respectively comprise at least one of: one or more half-duplex UEs, one or more full-duplex UEs, or any combination of two or more of the one or more half-duplex UEs and the one or more full-duplex UEs.

\* \* \* \* \*